United States Patent [19]

Huo-Lien et al.

[11] Patent Number: 5,029,806
[45] Date of Patent: Jul. 9, 1991

[54] FOOT-CONTROLLED WATER FAUCET

[76] Inventors: Chuang Huo-Lien; Chuang Shih-Wei; Chuang Kan-Jung, all of 4F., 17, Lane 281, Hsian St. Sec. 1, Peitou District, Taipei, Taiwan

[21] Appl. No.: 594,607

[22] Filed: Oct. 9, 1990

[51] Int. Cl.$^5$ .......................................... F16K 31/145
[52] U.S. Cl. .................................. 251/14; 74/99 A; 74/481; 74/512; 222/179; 251/57; 251/61.4; 251/253; 251/263; 251/295
[58] Field of Search ............... 4/249, 308, 405; 74/55, 74/57, 99 A, 481, 512; 222/179; 251/14, 57, 61, 61.2, 61.4, 61.5, 253, 263; 257/295; 137/354, 360, 454.5; 604/9

[56] References Cited

U.S. PATENT DOCUMENTS

| | | | |
|---|---|---|---|
| 1,204,588 | 11/1916 | Pocock | 251/253 |
| 1,836,766 | 12/1931 | Mullett et al. | 251/295 |
| 2,830,618 | 4/1958 | Mitchell | 251/295 |
| 2,966,328 | 12/1960 | Burnworth | 251/295 |
| 2,997,851 | 8/1961 | Trubert et al. | 251/57 |
| 3,188,011 | 6/1965 | Ternullo | 251/57 |
| 3,241,810 | 3/1966 | Keller, III | 251/253 |
| 3,536,294 | 10/1970 | Rodriguez | 251/295 |
| 3,967,809 | 7/1976 | Skantar | 251/61 |
| 4,052,035 | 10/1977 | Kenny et al. | 251/57 |
| 4,475,899 | 10/1984 | Muller | 251/57 X |

FOREIGN PATENT DOCUMENTS 932301 8/1973 Canada ............................ 222/179

Primary Examiner—George L. Walton
Attorney, Agent, or Firm—Asian Pacific Int'l Patent & Trademark Office

[57] ABSTRACT

A foot-controlled water faucet for regulating the outflow of water from a water faucet by means of air pressure comprises a compressing bladder connected with an air bladder in the water faucet by a passageway, a valve block, a ring body and a knob associated in proper order to form the water faucet. When stepping on the compressing bladder by foot the air inside is compressed and is squeezed to the air bladder in the water faucet via the passageway. The air bladder expands and pushes the platform as well as the stem in the ring body and the valve block respectively downward. The stem moves away from the opening of the valve block and water flows out. Water is stopped by releasing the compressing bladder which sucks back the air from the air bladder that is then contracts and allows the stem to move back to the original position. It can also be controlled by hand as an ordinary water faucet.

3 Claims, 4 Drawing Sheets

FOOT-CONTROLLED WATER FAUCET

BACKGROUND OF THE INVENTION

The present invention relates to a foot-controlled water faucet for regulating the water outflow from a water faucet. A conventional water faucet is usually controlled by turning its knob with hand. We have already accustomed to the above operation for getting water from a water faucet. However it conceals many disadvantages that directly influence our living.

One usually turns on a water faucet with his uncleaned hand which contaminates the turning knob of the water faucet. Although hands are cleaned after washing when the one reaches to turn the knob the hand is contaminated and has to be washed again.

It is most irritating in using water faucet in public place, such as hospital, public lavatory, where is densely populated. People would even not dare to touch the water faucets, afraid of being contaminated and getting infectious diseases. In a family, a housewife is busy with household works. Her hands may be greased and dirty sometimes. It is extremely inconvenient and impractical for her to use her hands to turn on the water faucet.

On the other hand, according to the habit of 20 million population of Taiwan in using water, water is wasted unintendedly. As shown in Appendices 1 and 2, in a gross approximation, 109 billion liters of water is used per year. The bill is totally about NT 600 million. With the same assumption in calculating the water used in U.S.A. of 200 million population, 14 billion liters of water are used. The bill is enormous. If the money is saved for the constructions and benefits for the country, people would live better and wealthier.

Therefore the invention is based on the problem of designing a convenient and practical device such that it no longer has the disadvantages described above.

The present invention provides a water faucet controlled by foot without using hands to operate. Hands would not be contaminated again after a thorough wash. Just step on the bladder of the invention and water flows out from the water faucet. When releasing the bladder, water stops flowing. The force pressing on the bladder, water stops flowing. The force pressing on the bladder may regulate the outflow. If long period of water outflow is necessary, the present invention can also be controlled as an ordinary water faucet.

SUMMARY OF THE INVENTION

The present invention relates to a foot-controlled water faucet for controlling the outflow of water by foot. It comprises a compressing bladder connected with an air bladder in the water faucet through a passageway (with outer radius 0.3 cm, inner radius 0.2 cm), a valve block, a ring body and a knob associated to define a water faucet. When stepping on the compressed air pressure is induced inside to provide a pushing force through the narrow passageway to the air bladder which expands and presses the stem of the valve body out of its position. Water is therefore let out. When stop pressing on the compressing bladder, the air is sucked back from the air bladder to the compressing bladder with a spring installed round the stem pulling the stem up to block the water outlet. The stepping and releasing of the compressing bladder by foot to control the water outflow of the water faucet substitutes the conventional way of hand controlling the water outflow. On the other hand, the present invention can also be controlled by hand as a regular water faucet when long period of water outflow is necessary. A person may step on the compressing bladder by foot and wash his hand first and then uses his cleaned hand to turn on the water faucet for a thorough washing. After both hands are cleaned the water faucet is turned off with a clean hand without contaminating the turning knob of the water faucet. It is a clean as well as convenient operation.

BRIEF DESCRIPTION OF THE DRAWINGS

For a better understanding of the characteristics and structure of the present invention, please refer to the following detailed description and drawings:

FIG. 6 is a similar drawing of FIG. 5 when the water faucet is temporarily turned on;

DETAILED DESCRIPTION OF THE PREFERRED EMBODIMENT

Figure 1:
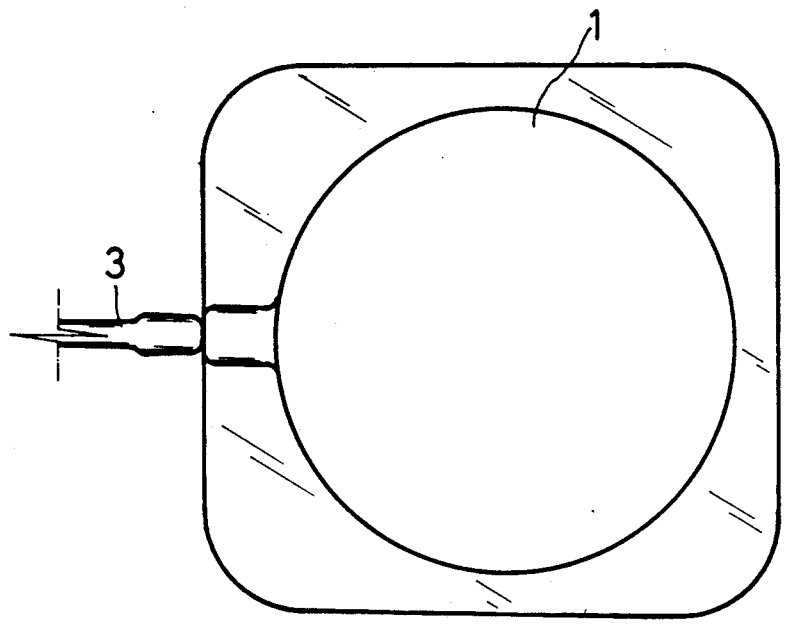
FIG. 1 is the top view of the compressing bladder of the present invention.
Figure 2:
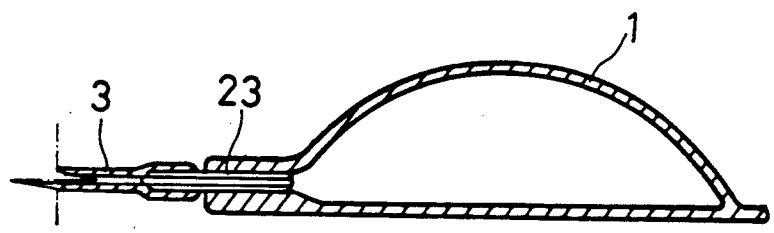
FIG. 2 is the vertically sectional view of FIG. 1.
Figure 3:
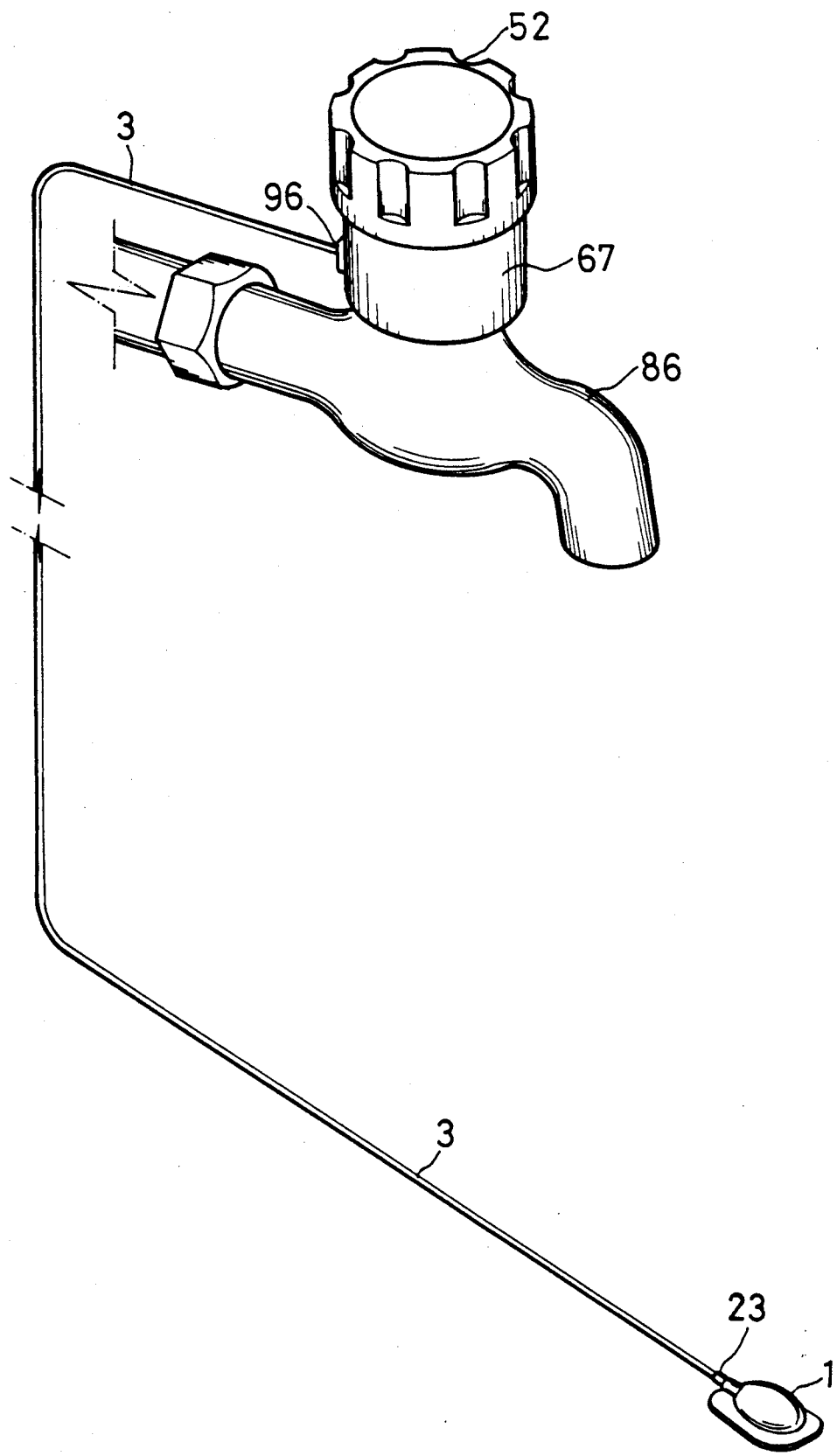
FIG. 3 is the perspective view of the preferred embodiment in accordance with the present invention.
Figure 6:
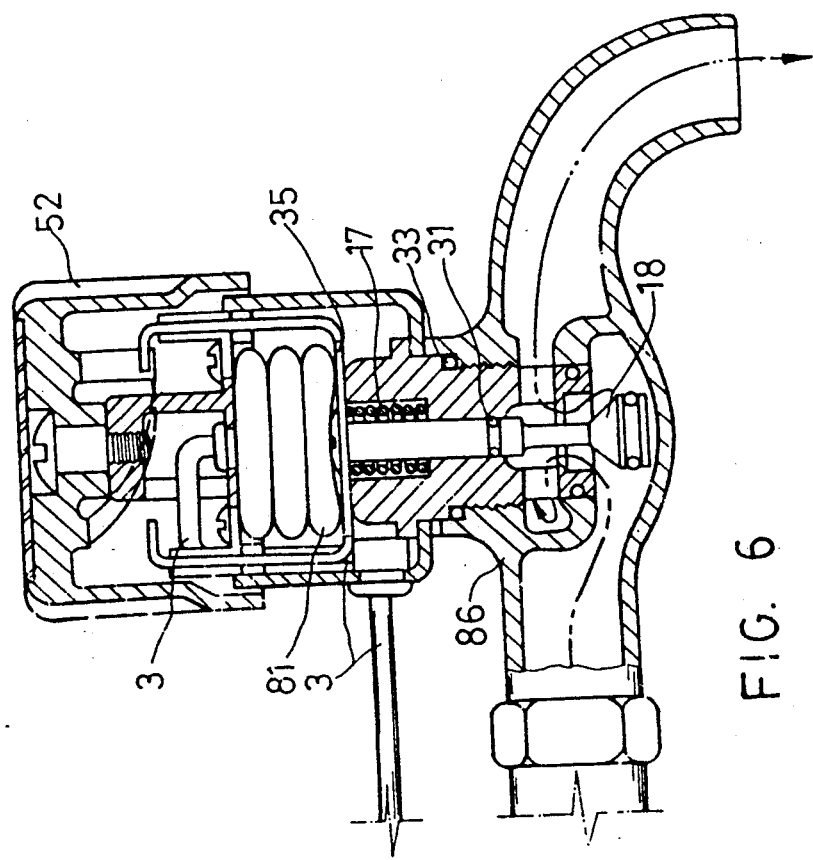

Referring to the accompanying diagrams, wherein FIG. 3 illustrates a perspective view of the preferred embodiment of the present invention, which comprises a water faucet, a compressing bladder 1 and a passageway 3. The compressing bladder 1 is made of rubber, or flexible plastic, or metal. It is hemi-spherical in shape and is glued on the cement floor or on tiles with strong adhesive. When the compressing bladder 1 is pressed on by foot the air inside is squeezed out from the bladder 1 to the air inlet 96 through the adapter 23 of the passageway 3. As illustrated in FIG. 6, air is blown into the air bladder 81 which expands and exerts a downward pressure onto the platform 35. The stem 18 is pushed away from the valve seat insert 32 and water flows out in the direction as indicated by arrows.

If the foot stops pressing on the bladder 1, the pressure in the bladder 81 is released and a suction force is induced so that the air is drawn back to the compressing bladder 1 from the air bladder 81 via the passageway 3. While the bladder 1 is recovering in shape the spring 17 axially disposed on the stem is restoring from compression and bringing the stem 18 to block up the valve seat 32. Water is therefore stopped as shown in FIG. 5.

Figure 5:
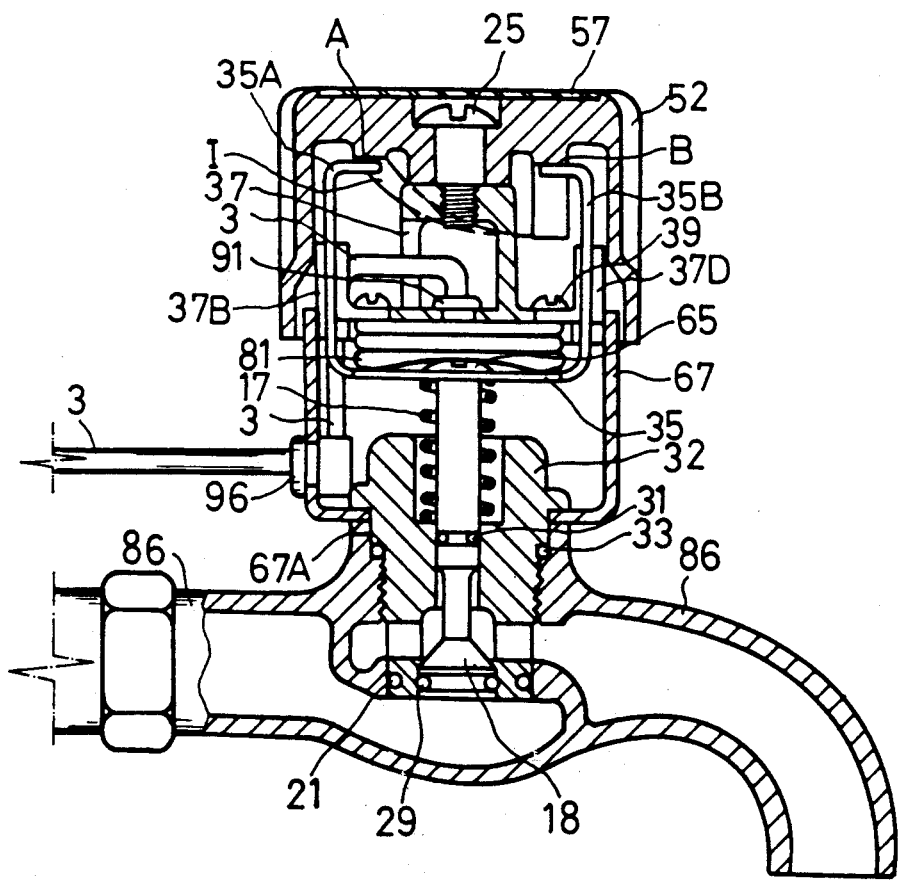
FIG. 5 is the vertically sectional view of FIG. 4, showing the internal structure of the water faucet when it is stopped.

The water faucet in FIG. 3 comprises a knob 52 disposed on the top for long term control of water outflow, a ring body 67 firmly mounted on a valve block 86 with a valve seat 32, (as shown in FIG. 5). A protrusion 67A is inserted into the connection between the valve block 86 and the ring body 67 so as to prevent disengaging. The central hole of the valve seat 32 is inserted with a stem 18 whose lower and middle end is respectively disposed with a seal ring 29 and a small seal ring 31 to prevent leakage. A spring 17 axially mounted onto the stem 18 in such a manner that the bottom of the platform 35 and the valve seat 32 abut each other, and the water outflow is permitted by the stem 18.

The platform 35 is firmly secured onto the top of the stem 18 by a screw 65. The platform 35 is closely related to the air bladder 81 with their surfaces pressing on each other and defining a circular contact surface.

The cam-shaped cant I is disposed on both sides of the knob 52. The two sides of the platform 35 respectively defines an angle plate 35A and 35B bending upward. The points A and B of cant I are in contact with the bending angle of the platform 35 in such a way that the angle plate 35A and 35B sliding up and down along cant I when turning the knob 52.

The passageway 3 is inserted into the external end of the angle joint 96 which is firmly engaged in the ring body 67 and is further connected to the air nozzle 91 of the air bladder 81 which is anchored in the securing seat 37 in the ring body 67. The securing seat 37 is mounted at the upper part of the ring body 67 by means of screwing 39.

Figure 4:
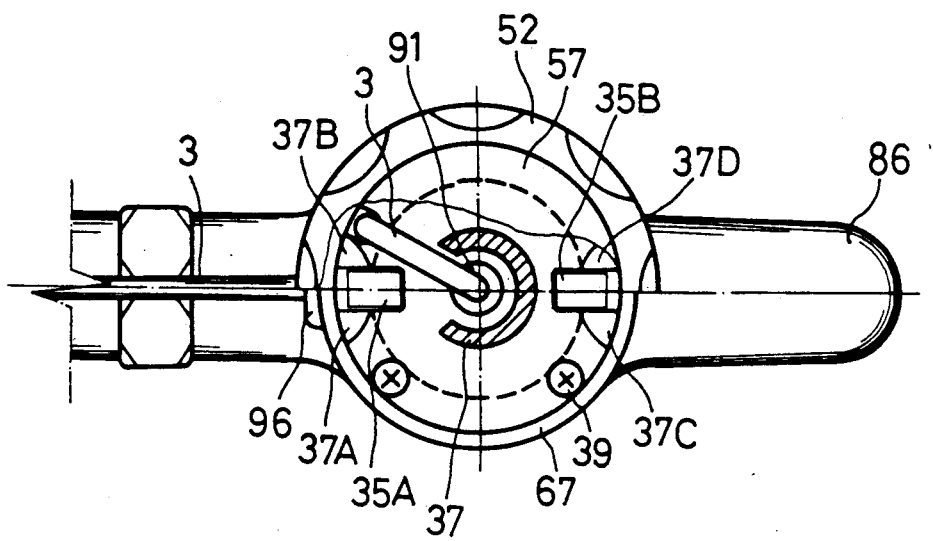
FIG. 4 is the top view of the water faucet showing a part in section.

There are four posts (referring to FIG. 4, 37A and 37B on the left, 37C and 37D on the right) disposed on both sides of the securing seat 37. Their function is to ensure that 35A and 35B of the platform 35 slide vertically up and down without any sideway movement.

A hollow cylinder is axially disposed in the securing seat 37 which provides an aperture on the left to introduce the passageway 3 into the water faucet and terminate at the air nozzle 91 connected with the air bladder 81.

In the upper part of the hollow cylinder of the securing seat, disposed a bolt hole into which a central bolt 25 is screwed to fix the knob 52. The knob 52 then is able to turn 180 angle and a decorative pad 57 is stuck onto the knob 52.

After describing the structure of the embodiment of the present invention, the operation is illustrated with an aid of FIG. 6.

When intended to let the water out, just step on the compressing bladder 1 which induces an internal pressure and squeezes the air into the air bladder 81 through the passageway 3. The bladder 81 is blown up and pushes the platform 35 downward and at the same time the stem 18 moves down and water flows out as indicated by the arrows. If intend to stop the water, just leave the compressing bladder 1 in which the pressure is reduced and a suction force induced draws back the air from the air bladder 81 through the passageway 3. The spring 17 bounces back and the stem 18 returns to the securing seat 32 and blocks the opening Outflow is then stopped as shown in FIG. 5.

Figure 7:
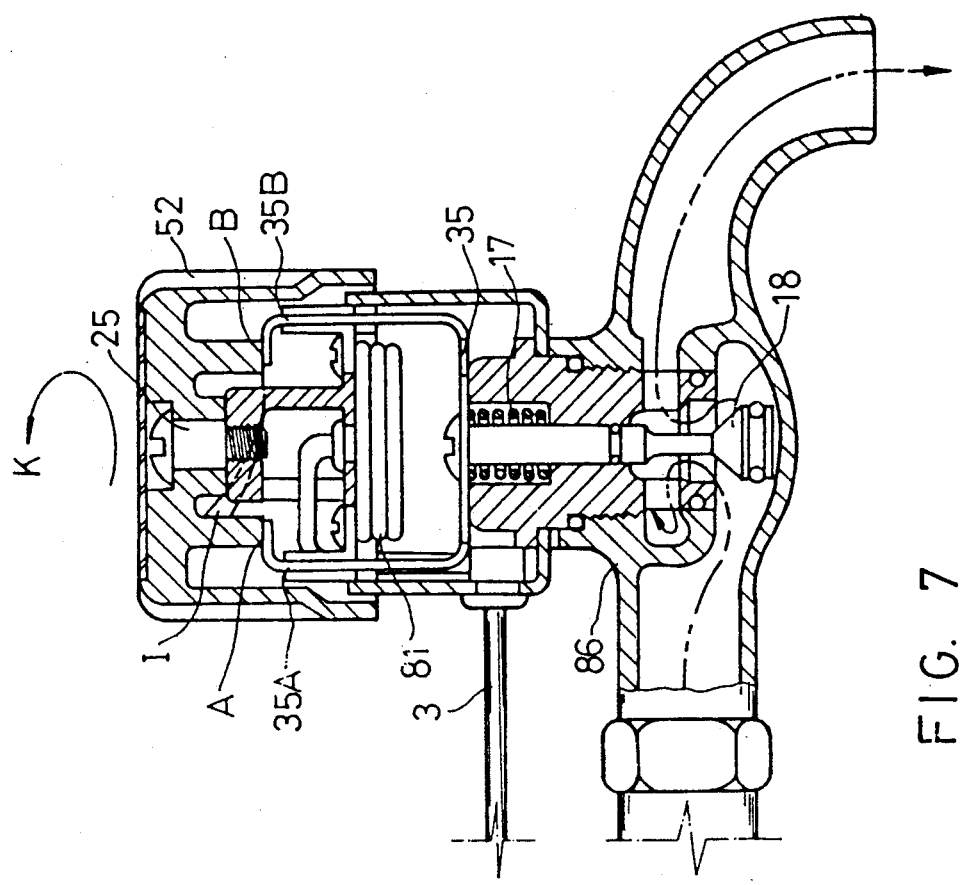
FIG. 7 is a similar drawing of FIG. 6 when the water faucet is turned on for a long period.

Another embodiment of the present invention for long term outflow of water is described as follows:

Referring to FIG. 7, as intend to have water outflow for a long period of time, it is no need to step on the compressing bladder 1 but just turn the knob 52 in the direction of K as shown by the arrow, anti-clockwise in 180 angle. The angle plate 35A and 35B then slide downward along the cant I of the knob 52 with the stem 18. The water flows out to the side opening through the central opening of the lower part of the valve seat 52 as indicated in the drawing. Outflow can also be regulated by turning the knob 52 in various angle.

As intended to stop the outflow, turn the knob 52 clockwise through 180 angle and the angle plates will be pulled up along the cant I of the knob 52 by the restoring force of the compressed spring 17. The stem 18 then blocks the central opening of the valve seat 32 and the outflow is stopped as illustrated in FIG. 6.

The embodiments of the present invention can be controlled by foot and also by means of hand for a long period of outflow. Therefore the invention is obviously practical.

In conclusion, the present invention is characterized by using air as a driving means which is controlled by foot to regulate the outflow from a water faucet. It can also be controlled by hand as an ordinary water faucet. By the advantages of simple structure, low cost, easy operation, non-contamination and water saving, the present invention is financially beneficial to the society and individual family.

| Appendix 1: Table of 80 persons using water for washing hands in different times and places | | | | | | | |
|---|---|---|---|---|---|---|---|
| No. of Person | Water Used (liter) | No. of Person | Water Used (liter) | No. of Person | Water Used (liter) | No. of Person | Water Used (liter) |
| 1 | 2.5 | 21 | 1.1 | 41 | 2.3 | 61 | 2.5 |
| 2 | 2.7 | 22 | 3.2 | 42 | 1.8 | 62 | 1 |
| 3 | 1.3 | 23 | 2.8 | 43 | 0.6 | 63 | 1.2 |
| 4 | 1.2 | 24 | 1 | 44 | 1.7 | 64 | 2.7 |
| 5 | 4 | 25 | 1.9 | 45 | 2.5 | 65 | 1.8 |
| 6 | 2.5 | 26 | 0.8 | 46 | 2.1 | 66 | 2.3 |
| 7 | 2 | 27 | 2.5 | 47 | 1.3 | 67 | 1.6 |
| 8 | 2.6 | 28 | 2.2 | 48 | 3.4 | 68 | 2.5 |
| 9 | 1.1 | 29 | 1.4 | 49 | 1.2 | 69 | 1.4 |
| 10 | 1.7 | 30 | 2.5 | 50 | 2 | 70 | 2.4 |
| 11 | 2.2 | 31 | 1.7 | 51 | 1.4 | 71 | 0.7 |
| 12 | 2.7 | 32 | 1.9 | 52 | 1.7 | 72 | 2.7 |
| 13 | 0.9 | 33 | 2.8 | 53 | 2.2 | 73 | 1.2 |
| 14 | 2.3 | 34 | 2.3 | 54 | 1.9 | 74 | 3.5 |
| 15 | 2.2 | 35 | 2 | 55 | 3.1 | 75 | 2.1 |
| 16 | 1.8 | 36 | 1.5 | 56 | 1.4 | 76 | 1.8 |
| 17 | 3 | 37 | 2.6 | 57 | 0.8 | 77 | 1.7 |
| 18 | 0.5 | 38 | 1.4 | 58 | 1.7 | 78 | 2.4 |
| 19 | 1.7 | 39 | 2.1 | 59 | 1.1 | 79 | 3.2 |
| 20 | 2.4 | 40 | 2.5 | 60 | 3 | 80 | 2.9 |
| Total | 41.3 | Total | 40.1 | Total | 37.3 | Total | 41.6 | average volume of water used/person each time: 2.00375 liters
*(41.3 + 40.1 + 37.3 + 41.6) ÷ 80 = 2.00375 (liters)

| Appendix 2: assumed frequency of hand wash each person/day | | | | |
|---|---|---|---|---|
| | Before Meal (after) | Before Urination (after) | Before Excretion (after) | Others (on duty etc) | Total |
| Frequency | 3 | 3 | 1 | 3 | 10 |

Equation (1):
Water used/Person each time × Frequency/day × No. of person = Total volume of water used
2.00375 (l) × 10 × 365 × 1.5 × 10 = 109705312500 (l)
= 109705312.5 (m$^3$)

Equation (2):
Total volume of water used × Charge/unit volume = Total amount of water bill
109705312.5 (m$^3$) × 5.6 (NT/m$^3$) = 614349750 (NT)

*Charge: NT 5.6/m$^3$ (information: Taipei Water Department)
*Effective capacity in Shin-Men Reservoir is 250 million m$^3$ (information: Reservoir Service Office in Shin-Men Reservoir)

What is claimed is:

1. A foot-controlled water faucet for regulating the outflow of water from a water faucet by means of air pressure to control the outlet of the water faucet, comprising:

a valve block of a conventional type with an outflow channel which is usually closed by a valve stem;

a ring body screwed onto the valve block by means of a valve insert having a valve seat, which is centrally disposed with the stem therein and being surrounded by a spring, the top of the stem secures a platform element thereon with an air bladder positioned therein, the upper part of the bladder being associated with an air nozzle which is connected to an external pressure source by means of an angle joint; the stem being inserted into the central opening of the valve insert having a middle and bottom part thereof and mounting a seal ring at the middle and bottom parts thereby preventing leakage; the spring surrounding the stem pushing the platform and the stem upward for blocking the outlet opening of the valve seat and preventing water outflow through the outflow channel;

a knob of a shape that is compatible with the ring body on which it is mounted, a cant surface disposed on the internal flange of the knob, which is generally in close contact with the platform of the ring body, when turning the knob in anti-clockwise direction, the inclination of the cant surface increases, causing the cant surface to engage the platform, thereby the platform gradually moving downward and pushing the stem downward to open the outflow channel 1;

said pressure source includes a compressing bladder for blowing air into the air bladder defining a hollow chamber which allows accommodation of air and is made up of flexible materials; and a passageway connecting the air bladder in the ring body and the compressing bladder defining a conduit made up of different types of flexible materials; air passing through the passageway to the air bladder when stepping on the compressing bladder, blowing up the air bladder which expands and pushes the platform downward and compresses the spring, through the outflow channel; when the stem being pushed and moved away from the opening of the valve seat and permitting water outflow while at the same time the compressing bladder released and air sucking back from the air bladder relieve the platform and the spring which restores and moves the stem upward to block the opening of the seat valve, to stop the water outflow through the outflow channel.

2. A foot-controlled water faucet as defined in claim 1, wherein the base of the stem in the ring body includes a polygonal shape stopper element which defines an inclination on either side such that the stem describes a close contact with the outlet opening of the valve seat to ensure a tight closure, if the stem is moving downward, water flowing between the base of stem and the opening of the valve seat reduces the resistance against outflow and increases the volume of outflow.

3. A foot-controlled water faucet as defined in claim 1, wherein the air in the compressing bladder can be substituted by liquid.

* * * * *